United States Patent [19]

Stover et al.

[11] Patent Number: 5,009,359

[45] Date of Patent: Apr. 23, 1991

[54] PROCESS FOR JOINING WORKPIECES OF METAL OR CERAMIC BY BOUNDARY SURFACE DIFFUSION

[75] Inventors: Detlev Stover, Niederzier; Hans-Peter Buchkremer, Heinsberg; Rudolf Hecker, Jülich, all of Fed. Rep. of Germany

[73] Assignee: Forschungszentrum Julich GmbH, Jülich, Fed. Rep. of Germany

[21] Appl. No.: 521,091

[22] Filed: May 9, 1990

[30] Foreign Application Priority Data

May 13, 1989 [DE] Fed. Rep. of Germany ....... 3915702

[51] Int. Cl.$^5$ ..................... B23K 20/00; B23K 20/24
[52] U.S. Cl. .................................. 228/175; 228/193; 228/230; 228/121; 228/124; 228/261
[58] Field of Search ............... 228/122, 124, 121, 138, 228/175, 193, 227, 230, 243, 261

[56] References Cited

U.S. PATENT DOCUMENTS

| | | |
|---|---|---|
| 3,980,220 | 9/1976 | Wolfe et al. ........................ 228/175 |
| 4,096,615 | 6/1978 | Cross ................................. 228/175 |
| 4,152,816 | 5/1979 | Ewing et al. ....................... 228/193 |
| 4,270,256 | 6/1981 | Ewing ............................... 228/193 |
| 4,757,934 | 7/1988 | Greenstein ......................... 228/123 |
| 4,899,923 | 2/1990 | Findlan ............................. 228/243 |

FOREIGN PATENT DOCUMENTS

| | | | |
|---|---|---|---|
| 2921217 | 12/1979 | Fed. Rep. of Germany ...... | 228/193 |
| 213375 | 10/1985 | Japan ................................. | 228/193 |
| 231473 | 11/1985 | Japan ................................. | 228/122 |

*Primary Examiner*—Sam Heinrich
*Attorney, Agent, or Firm*—Frishauf, Holtz, Goodman & Woodward

[57] ABSTRACT

The following steps are performed for joining workpieces of metal or ceramic to each other by boundary surface diffusion at the junction location. After laying together the surfaces at which the workpieces are to be joined together, a layer is applied to the outer edge of the joint location consisting of a material compatible with the material of the parts to be joined and mechanically stable under high static pressure. The layer is fixed and sealed. Thereafter the workpieces are diffusion welded by hot isostatic pressing (HIP). A layer meeting the requirements of this process can be applied by plasma spraying onto the region of the seam at the outer edge of the junction location.

1 Claim, 1 Drawing Sheet

FIG. 1
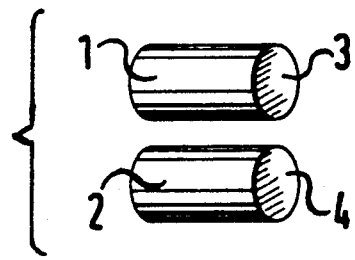
FIG. 2
FIG. 3
FIG. 4
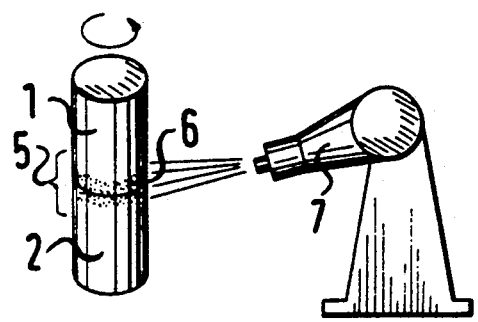
FIG. 5
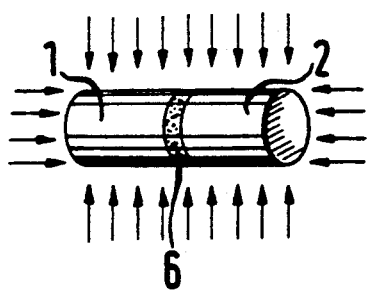
FIG. 6
a) PREPARE CONTACT SURFACE
b) JOIN AND HOLD FAST
c) MACHINE THE SEAM
d) PLASMA COATING (APS or VPS)
e) HIP

PROCESS FOR JOINING WORKPIECES OF METAL OR CERAMIC BY BOUNDARY SURFACE DIFFUSION

This invention relates to a process for joining workpieces by boundary surface diffusion between the materials of the workpieces contact during hot pressing.

Welding of workpieces by diffusion bonding is already known. The junction locations of the workpieces are joined to each other under pressure at high temperature. The success of the operation depends upon setting the pressure and temperature at such values that the components of the material of at least one of the parts connected with each other diffuse into the material of the other workpiece part, or perhaps react chemically with the components of the material of the other workpiece part, for example in the case of metals by formation of alloys or intermetallic phases and in the case of joining ceramic parts, by joining metal with ceramic, by oxide, nitride or carbide formation or diffusion. Diffusion welding makes it possible to obtain a homogeneous joint at the junction location which has high resistance to the effect of heat. Care has to be taken in such cases to ensure that the junction surfaces to be bonded to each other during the welding procedure are kept free of foreign matter so that no undesired compounds or inclusions are produced which would impair homogeneity at and near the junction and thereby diminish the strength of the joint.

It is known to join together plane surfaces by the use of compressing force applied on a single axis. In the case of plane surfaces the application of uniform pressure by corresponding guiding of the parts to be joined can be obtained with sufficient accuracy. In the case of complicated workpiece shapes the clamping of the workpiece parts to the press pistons of the diffusion welding apparatus and the even transfer of pressure to the surfaces to be joined is obtainable in many cases only at great expense. The maximum size of the surface area to be joined depends in such cases on the maximum force that can be brought to bear on the junction location.

SUMMARY OF THE INVENTION.

It is an object of the invention to provide a diffusion welding process which makes possible a diffusion welded joint independently of the shape of the surface to be joined and also independently of the shape of the workpiece parts for different kinds of workpiece combinations.

Briefly, the workpiece parts to be joined are put together at their respective surfaces to be bonded to each other and the junction location is then coated at its outer edge or rim. The externally visible seam between the workpiece parts is thus coated with a layer. The layer material is compatible with the materials of the workpiece parts. Those workpiece materials are neither chemically attacked nor changed in their physical quality by the material of the layer. The layer material is so selected that, with or without a further treatment after the application of the layer, it remains stable until it is loaded with the pressure necessary for the production of the joint.

The joint location is fixed by means of the layer and is sealed at its external seam. Directly after such fixation the workpiece parts which are thus held together are diffusion welded by hot isostatic pressure (HIP). In the HIP process a pressure which is uniform on all sides is exerted on the workpiece parts which also is exerted uniformly on the junction surfaces at the junction location, independently of how the workpiece parts are shaped or whether the junction surfaces have a surface structure. Thus metallic junction surfaces can be loaded very uniformly even beyond the flow stress threshold during hot isostatic pressure, without the occurrence of undesired distortion. The diffusion rate, accelerated by pressure in a HIP process, improves the closing of residual pores at the junction location with relatively little grain size growth, as compared with sintering without application of pressure.

Preferably the seam at the location of joining is coated by plasma spraying. In this case the layer is applied by means of a plasma burner, especially by means of a plasma spray gun, by which strongly heated gas streaming out of the burner nozzle serves as the feeding means and the carrier of metal or ceramic powder which after being melted in the gas and subsequent solidification on the surface of the workpiece parts, forms the desired layer at the location of the seam, thus affixing to each other the workpiece parts that are still unbonded over the area of the place of junction.

By plasma spraying it is possible to obtain high material density in the layer and therefore very little porosity and high gas-tightness for argon, nitrogen or other gas atmospheres which are provided in the operation of the HIP process. Not only atmospheric plasma spraying (APS), but also vacuum plasma spraying (VPS) can be used in order to obtain an intimate diffusion bond also between layer and wall surfaces of the workpiece parts to be joined. In order to increase the diffusion bonding in the applied layer at the joint location it can be useful to condense the layer further after its application by sintering at low pressure.

In principle all materials that can be melted at a surface are suitable as layer materials, so that in general, for every pair of parts to be joined, there can also be selected a layer material compatible with the materials of the workpiece parts. For example, as an iron-base oxide-dispersion-hardened alloy (ODS alloy) it is possible to use an FeCrAl powder, or as a nickel-base ODS alloy, NiCrAl powder can be used. For alloys stable at high heat, as for example the alloys known under the designation Hastelloy X, a NiFeCr powder is suitable. In the case of ceramic workpiece parts the same ceramic contained in the workpieces is preferably used to produce the layer, thus for workpiece parts of $Al_2O_3$ a powder of $Al_2O_3$ should be used. In any case, the layer applied to the joint location is to be formed of a material which is compatible with the material of the workpiece parts with respect to its temperature expansion coefficient. It is also necessary for the layer to have a sufficient mechanical stability for withstanding the gas pressure up to 400 MPa which is to be provided in the HIP process at high HIP temperature. The mechanical stability of the layer must be sufficiently great to permit the diffusion bonding at the joint location to be produced by hot isostatic pressing before the material of the layer can penetrate, by hot flow, into the joint at the place of the seam and thereby spoil the desired diffusion bonding between the workpiece parts.

BRIEF DESCRIPTION OF THE DRAWING

The invention will now be further described by way of illustrative examples with reference to the annexed drawing, in which FIGS. 1, 2, 3, 4 and 5 are diagrams illustrating steps for the process of the invention and FIG. 6 is a flow diagram shown parallel to the sequence of FIGS. 1–5 identifying the nature of the several steps of an example of the process of the invention.

DESCRIPTION OF THE ILLUSTRATED EXAMPLES

In the drawing a process for diffusion welding of two workpieces 1 and 2 is schematically shown. FIG. 1 shows the workpieces 1 and 2 in the stage of preparation of the contact surfaces for the joint that is to be made. The preparation, for example, can consist of grinding, polishing, defatting and etching.

FIG. 2 shows the workpiece parts 1 and 2 about to be put together with the respective surfaces 3 and 4 in contact with each other after which they are to be fixed in that juxtaposed position. When held in position together, the workpiece parts are rotated about an axis passing through the joint surface for purposes of treatment in the following steps. FIG. 3 represents a process step treating the region 5 joining the outer seam around the edge of the surfaces to be joined. In the illustrated case the seam region 5 is sandblasted before being coated with a layer in the next step.

FIG. 4 illustrates the application of the layer 6 on the seam region 5. In the illustrated case this is performed by plasma spraying with a plasma spray gun 7 directed at the seam region 5 while the clamped-together workpiece parts are rotated about a common axis perpendicular to the joint surface. In this fashion every part of the seam region 5 is passed underneath the plasma jet many times during the application of the layer 6 so that a material layer is formed having a thickness between 100 and 700 $\mu$m. The workpiece parts covered by the layer 66 at their junction location are then, as schematically shown in FIG. 2, hotly and isostatically diffusion welded in a HIP installation. FIG. 6, as already noted, is a flow diagram identifying the steps of the process illustrated in FIGS. 1–5.

The following examples describe junctions produced by the use of the above-described process.

EXAMPLE 1

A metal-to-metal joint was produced. The workpiece parts to be joined both consisted of a ODS alloy. The surfaces to be joined were polished and defatted before the putting together of the workpiece parts. The workpiece parts were put together and fixed in a rotatable position and were then sandblasted in the region of the seam at the outer edge of the joint location. The seam region was then coated by plasma spraying. In this example the layer was applied by vacuum plasma spraying (VPS). An argon/hydrogen mixture was used as the plasma gas. The seam region was sealed with a layer of FeCr. The spray pressure was set at from 50 to 60 mbar. The layer was applied with the plasma spray gun from a spacing of 270 to 280 mm. The applied layer had a thickness of 200 $\mu$m. The layer was gas-tight and the helium leak rate was less than $10^{-9}$ mbar · l/sec.

For diffusion welding the workpiece, which by now was fixated by the coating and thus simple to handle, was then put into an HIP installation and hot-isostatically pressed. The temperature in the HIP installation was about 1100° C., the pressure was 150 MPa, and the treatment duration was from in the range from 1 to 3 hours. A tensile strength test of the workpiece joint made as described above found an ultimate tensile strength at room temperature of 500 MPa. This corresponds to a tensile strength of 80% of the tensile strength of the ODS alloy from which the workpiece parts were made.

EXAMPLE 2

A metal-to-ceramic joint was made. One workpiece part was of $Si_3Ni_4$, the other was of Hastelloy X. The metal surface to be joined with the workpiece part of ceramic was polished. The ceramic surface was ground with fine grit. The seam region around the joint location was coated by plasma spraying in the same way that was described in Example 1, with a NiCr alloy used as the coating material. The data relating to plasma spraying corresponded to those of Example 1. A layer of a thickness of 400 $\mu$m was applied. The layer had a helium leak rate of less than $10^{-9}$ mbar · l/sec.

For diffusion welding of the joint a temperature equal to or somewhat less than 1200° C. and a pressure of 200 MPa was provided in the HIP installation. The treatment duration was equal to or somewhat less than 1 hour.

EXAMPLE 3

A ceramic-to-ceramic joint was produced. The workpiece parts both consisted of $Si_3N_4$. The surfaces of the workpiece parts which were to be joined were finely ground.

The seam region was coated by vacuum plasma spraying (VPS). Silicon (Si) served as the coating layer material. Before the hot isostatic pressing the Si layer was sintered in a nitrogen atmosphere and converted into $Si_3N_4$. After the sintering and conversion process, the layer at the joint location in the region of the seam was gas-tight.

The diffusion welding of the workpiece parts was carried out in the HIP apparatus at a temperature of 1900° C. and a pressure of 200 MPa in a nitrogen atmosphere. The treatment duration was 2–3 hours.

For determining the strength of the joint, the four-point bending break strength for the ceramic workpiece parts joined to each other was determined (bending load with two applied weights and two loading points between the weights with sample dimensions of 4.5 mm width, 3.5 mm height and 50 mm length and a spacing of 40 mm between the outer two loads and a 20 mm spacing between the two loading points, resulting in a bending load having a bending arm length of 10 mm). At room temperature a four-point bending break strength of 750 MPa was obtained. This value lay within the range of scatter of the four-point bending break strength of the basic material of the workpiece parts.

In the examples, the necessary high density and low porosity of the layer to be applied in the seam was obtained by the diffusion bonding of the sprayed-on materials. After their solidification the layers proved to be gas-tight even at high pressures during the hot isostatic pressing, with respect to the gases used as the HIP medium, as for example argon or nitrogen. In the case of metallic materials as coating material, the diffusion bonding is to be obtained mainly by use of vacuum plasma spraying, because in this case gas components such as oxygen, nitrogen, carbon dioxide and hydrogen should be kept away from the workpiece parts. In order to obtain an undisturbed diffusion joint with metals, the forming reaction products such, for example, as oxides, carbides or nitrides, has to be avoided.

Ceramic materials such as $Al_2O_3$, $Cr_2O_3$ and $ZrO_2$ can be readily coated directly by atmospheric plasma spraying. With workpiece materials of the nitride type such as, for example, $Si_3N_4$, a reactive plasma spray is used as described in Example 3: Si is sprayed in a carrier gas containing nitrogen, so that $Si_3N_4$ is produced already during the coating process. Further nitriding can then take place before the HIP process by sintering of the applied layer in a nitrogen atmosphere. In this manner the junction location is sealed gas-tight in the region of the seam with a layer compatible with the material of the workpiece parts.

In the examples the workpiece parts that are held together are rotated in the region of the plasma jet of the plasma spray gun. The plasma jet is directed perpendicularly onto the seam region. The seam is thus completely covered with the coating material and a sufficient coating thickness is obtained. Of course the movement of workpiece parts and plasma gun can also be carried out in another way, for example it is possible, in bonding of a ring with a shaft, also to provide corresponding movement of the plasma spray burner. If with the necessary layer material porosities are obtained, even if only of low degree, it is possible to compensate for that by a greater layer thickness.

The particular advantages of diffusion welding by HIP processes consist, on one hand, in the strong application of pressure uniformly on all sides, so that also surfaces that are nonplanar or have complicated surface relief patterns can be joined by diffusion. It is possible to join together materials that are not weldable, so that brazing does not need to be resorted to. Furthermore, even the size of the surfaces to be joined is limited only by the working volume of the HIP installation. The surface pressure thus represents no limit, as in the case of single-axis hot pressing.

Although the invention has been described with reference to particular examples, it will be understood that variations and modifications are possible within the inventive concept.

We claim:

1. A process for joining workpieces, both of metal or of ceramic or one of metal and one of ceramic, to each other by hot isostatic pressing and boundary surface diffusion between the materials of the respective workpieces at this location of joining, in which process junction surfaces of the respective workpieces are put together and fixed in juxtaposition, and are then subjected to hot isostatic pressing, said process comprising the steps of:

completing the fixation of the juction surfaces of the workpieces in juxtaposition to each other by plasma jet coating of the outer edge of the location of joining with a layer compatible with the materials of the workpieces;

after plasma jet coating and before hot isostatic pressing, sintering at low pressure said layer produced by plasma jet coating;

applying mechanically stable pressing force until hot isostatic pressing is performed; and sealing gas-tight the location of joining and hot pressing isostatically the fixated workpieces while the location of joining is sealed gas-tight.

* * * * *